L. W. CAMPBELL.
PICKER STEM.
APPLICATION FILED MAY 13, 1915.
1,277,853. Patented Sept. 3, 1918.
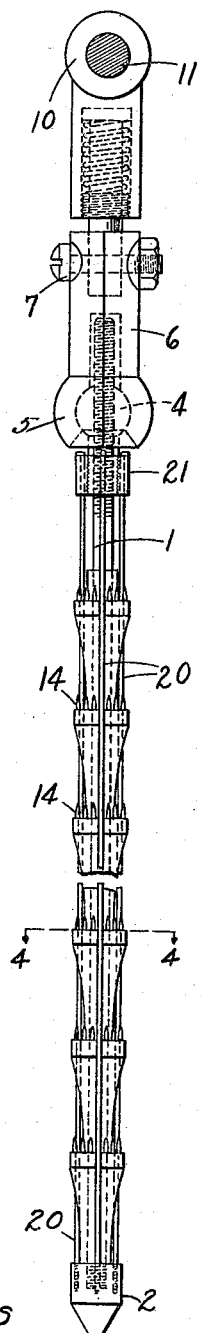
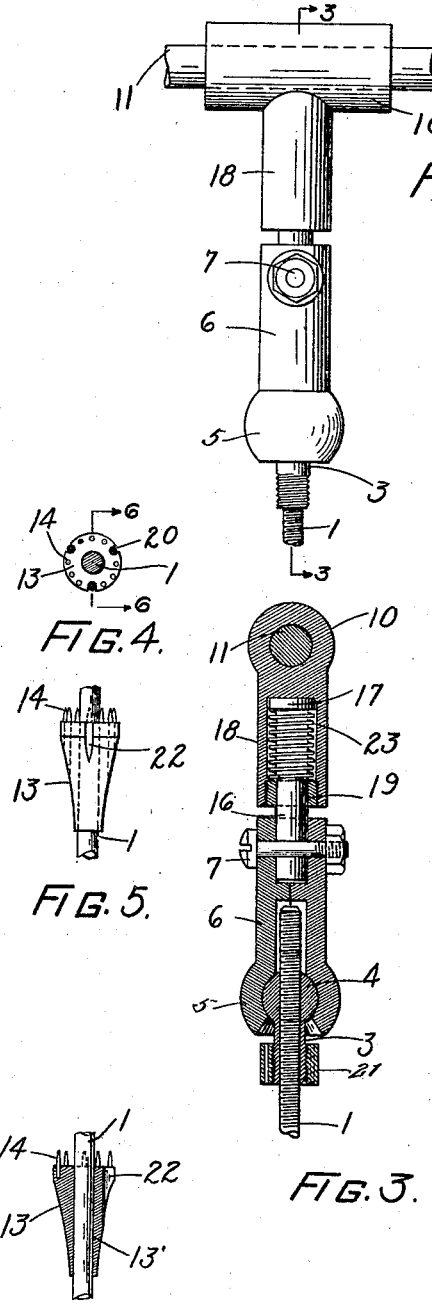
WITNESSES
Jas. C. Hamilton.
Victoria Lowden
INVENTOR
LEON W. CAMPBELL
BY
ATTORNEY

UNITED STATES PATENT OFFICE.

LEON WM. CAMPBELL, OF BOSTON, MASSACHUSETTS.

PICKER-STEM.

1,277,853. Specification of Letters Patent. Patented Sept. 3, 1918.

Application filed May 13, 1915. Serial No. 27,942.

*To all whom it may concern:*

Be it known that I, LEON W. CAMPBELL, a citizen of the United States, residing at Boston, county of Suffolk, Commonwealth of Massachusetts, have invented certain new and useful Improvements in Picker-Stems, of which the following is a specification.

My present invention relates to certain improvements in picker stems and particularly to the picker stem of cotton harvesting machines. Such stems are usually arranged in groups and it is desirable that such groups be loosely suspended in series from a carrier which lowers them down through the plant and then raises them, drawing them up through the plant in such a manner as to engage the bolls of cotton and gently pluck them from the plant.

The special features involved in my invention include the yielding mount of the stem in such a way that the plucking is effected through a resilient means. Various other features with respect to the guarding of the plucking teeth and the mounting of the plucking element are also included.

The construction and operation of my device will be more fully disclosed in the specification which follows in which reference is made to the drawing which shows a preferred form of my device as an illustrative embodiment. Throughout specification and drawings like reference numerals are employed to indicate corresponding parts, and in the drawings:

Figure 1 is an elevation of one of my picker stems,

Fig. 2 a detail of the upper or mounting end of the same,

Fig. 3 a section on the line 3—3 of Fig. 2,

Fig. 4 a transverse section on the line 4—4 of Fig. 1,

Fig. 5 a detail in elevation of one of the picker units, and

Fig. 6 a section through such a unit.

The preferred form of my picker stem, as illustrated in the foregoing drawings, comprises a stem or rod member 1, upon which are mounted a plurality of removable or replaceable picker units 13. The rod 1 is threaded at its lower end to receive a pointed ferrule 2 which facilitates the penetration of the stem as it is lowered through the plant without breaking or crushing the branches. The upper end of the rod is threaded into a sleeve 3, having an enlarged circular head or ball 4 at its upper end. The ball 4 is received in a correspondingly shaped socket 5 in the enlarged lower end of a longitudinally divided coupling, the parts of which are fastened together by a bolt or other fastening 7. The ball and socket joint 4—5 permits the stem to have a universal swinging movement relative to the coupling 6.

In the upper end of the coupling 6 and penetrated by the fastening bolt 7, is a stem 16 having a head 17 which is slidably mounted within a bore in the vertical member 18 of a T-shaped coupling 10. The lower end of the vertical member 18 is tapped to receive an annular plug 19 which supports a spring 23 disposed between the plug 19 and the head 17 of the stem 16. The transverse member of the T-coupling 10 has an opening through which the rod 11 passes. The rod 11 is the supporting member from which the picker stems are suspended.

On the rod 1 and confined between the ferrule 2 and a collar 21 near the upper end of the rod, is a gang of removable and replaceable downwardly tapered abutting sleeves 13. These sleeves are preferably slidable on the stem having a short travel as the stems are inverted. The upper enlarged end of each sleeve has an annular series of holes drilled in its upper face concentric to the longitudinal bore $13^1$ therethrough for the rod 1. Set in said holes is a plurality of upwardly extending pointed pins 14 which engage and separate the fiber from the bolls of the cotton plants. The annular series of pins on each sleeve or unit is "covered" or protected by the overhang of the enlarged end of the sleeve next above it, but is accessibly exposed to the fiber by the taper of the next sleeve which slopes in and terminates within the circle of the pins themselves. The operation of these sleeves is as follows: When the picker stem is inverted, the sleeves slide along the rod 1 until the collar 21 contacts the lower end of the sleeve 3. This brings the sliding sleeves 13 to an abrupt stop and tends to loosen and dislodge the cotton from the picking elements 14. As stated above, the shifting feature of the collar 13 is preferable but the gang may be set tight on the stem if preferred. The stems may be positively doffed, usually by being brought beneath a blower, but the jarring action described is effective in that it loosens the cotton fibers caught by the teeth. The ferrule 2 stops the movement of the sleeves 13 in the opposite direction when the stem is restored to its original position. Extending from the stop 21 which is mounted on the lower end of the sleeve 3 to the ferrule 2 are a plurality of longitudinal guards formed of wire. These guards are tapped into the ferrule 2 and are drawn through openings in the stop 21, after which their ends are turned down, so as to be drawn taut longitudinally of the stem. Each one of the picker units 13 is provided at its upper edge with a series of longitudinal grooves 22 corresponding in number to the number of wires 20 so as to form a sliding engagement with the wires 20. This holds the picker units 13 against rotation and guides and steadies them in their movement on the stem 1. The wires 20 form for the points 14 of the picker unit a longitudinal guard which prevents the branches of the cotton plants from becoming engaged by the sharp points 14.

In operation, the wires 20 do not interfere at all with the engagement of the points with the cotton which is able to penetrate past these longitudinal guard wires so as to overlap the engaging points 14. The yielding nature of the spring 23 permits a very gentle plucking action of the stem as a whole so that as the points 14 engage the cotton they are permitted to get a gentle penetrating action as the stem rises and a gradual and general longitudinal or upward pull on the cotton so as to detach the cotton boll from the plant without uprooting the plant or breaking its branches or stripping the foliage.

Various modifications in the detail of construction of the device shown may obviously be made within the limits of the appended claims without departing from the spirit of the invention.

What I therefore claim and desire to secure by Letters Patent is:

1. In a picker stem, a stem member, a plurality of picker units mounted in superposed relation thereon, each unit of greater transverse area at one end than at its other end and said units disposed each with its larger end adjacent the smaller end of an adjacent unit, a series of engaging elements on the larger end of each unit, and a longitudinal guard effectively disposed relative to said stem member and outside of said series of engaging elements.

2. In a picker stem, a stem member having a plurality of superposed picker portions, each portion of greater transverse extent at one end than at its other end, a series of engaging elements on the larger end of each picker portion and disposed within the overhang of the enlarged portion of the picker next above to be protected thereby, and guard members disposed substantially parallel to said stem member to prevent the stem of the plant from contacting said engaging elements.

3. In a picker stem, a stem member, a plurality of picker units slidable on said member, each unit consisting of a tapered member having a longitudinal bore to receive the stem member and having a series of engaging elements on its larger end face, a member fixed at each end of said stem member and acting as stops to limit the sliding travel of said units, and a plurality of longitudinally extending guard members set in said fixed members and disposed to prevent the stem of the plant from contacting said engaging elements.

4. In a cotton picking device, a coupling connectible to a support, a picking stem having impaling prongs carried by said stem, a universal joint on which the stem is mounted, and a resilient connection between the joint and said coupling.

5. A picker stem comprising a stem rod, a gang of toothed picker units slidably mounted on said stem and having peripheral notches and a plurality of guard rods engaging the peripheral notches of said units.

6. A picker stem comprising a stem rod, a gang of toothed picker units on said rod, and a guard member engaging all of said units and extending along the stem, and effective to prevent contact of the plant stems with the teeth of said units.

7. In a picker stem, a picker unit having a series of engaging elements, and a guard contacting said unit outside of said engaging element series and effective to prevent contact of the plant stems with said engaging elements.

8. In a picker stem, a plurality of picker units, each having an annular series of vertically disposed upwardly pointed engaging elements, and a guard contacting all of said units outside of the engaging element series thereof and effective to prevent contact of the plant stems with said engaging elements.

9. A picker stem comprising a rod, a plurality of picker units mounted thereon in superimposed relation, and a plurality of spaced longitudinally disposed guards engaging the sides of said picker units and effective to protect said engaging elements from contact with the plant stems.

10. A picker stem comprising a rod, a plurality of picker units slidably and interchangeably mounted thereon in superimposed relation, and a plurality of spaced longitudinally disposed guards engaging the sides of said picker units and effective to protect said engaging elements from contact with the plant stems.

11. A picker stem comprising a rod, a plurality of picker units thereon, and a guard for said units arranged substantially parallel to said rod.

12. A picker stem comprising a rod, a plurality of picker units thereon, a longitudinally extending guard for said units, and means for mounting said guard near opposite ends of said rod.

13. A picker stem comprising a rod, a plurality of picker units thereon, a guard for said units, and means for mounting said guard near opposite ends of said rod in substantial parallelism with said rod and in contact with all of said units.

14. A picker stem having picking units, a guard for picker units consisting of a plurality of members longitudinally extending along and secured near opposite ends of the stem and having contact with said units.

15. A picker stem comprising a stem member, a plurality of picker units arranged thereon in superimposed relation, and a guard for said units secured near opposite ends of the stem and engaging all of said units in the direction of their length.

16. A picker stem having picking units, a guard for the picker units consisting of a rod engaging all of said units in the direction of their length.

17. A picker stem having picking units, a guard for the picker units consisting of a plurality of spaced rods respectively engaging said picker units at alined points.

In testimony whereof I affix my signature in presence of two witnesses.

LEON WM. CAMPBELL.

Witnesses:
VICTORIA LOWDEN,
MARION C. HOBBS.

Copies of this patent may be obtained for five cents each, by addressing the "Commissioner of Patents, Washington, D. C."